UNITED STATES PATENT OFFICE.

ASAHEL K. EATON, OF NEW YORK, N. Y., ASSIGNOR TO HUGH M. EATON, OF BROOKLYN, NEW YORK.

PROCESS OF REMOVING TIN FROM THE SURFACE OF OTHER METALS.

SPECIFICATION forming part of Letters Patent No. 723,197, dated March 17, 1903.

Application filed January 9, 1903. Serial No. 138,341. (No specimens.)

*To all whom it may concern:*

Be it known that I, ASAHEL K. EATON, a citizen of the United States, residing at the city of New York, county of Kings, and State of New York, have invented a certain new and useful Process of Removing Tin from the Surface of other Metals, of which the following is a specification.

My invention relates to what is known in the art as "detinning," and has for its object to remove metallic tin from the surface of other metals, particularly for the utilization of tin-scrap by recovering the tin therefrom.

To these ends it consists of the method hereinafter described, and more particularly pointed out in the claims.

In trying on a practical scale a number of solvents I have found the most suitable and also the most economical to be sodium bisulfate, a compound commonly known in its crude state as "salt cake" or "niter cake." This salt is a residue from the manufacture of nitrate and hydrochloric acids and is always plentiful, and therefore comparatively low price.

In carrying out my process I prefer to follow the steps now to be set forth, though it is obvious, of course, that the same may be varied considerably without departing from the spirit of my invention—as, for example, the proportion of solvent used in the bath must be determined largely according to the character of the material on which the solvent is to work. This, however, can be readily determined by any person skilled in the art who undertakes to practice my invention. I first dissolve fourteen hundred pounds of sodium bisulfate in seven hundred gallons of water, and into this put one ton of material to be worked, such as scrap-tin. The whole is then subjected to a boiling temperature for about four hours, after which the solution is transferred to another receptacle, as a crystallizing-tank, and then if it is found that some of the tin remains on the scrap a sufficient quantity of fresh solution is thrown thereon and heated until the last portions of the tin are removed. The reaction involved thus far is as follows: The extra equivalent of sulfuric acid in the bi-salt used is loosely held, and under the action of heat its affinity for tin is sufficient to cause a complete combination with that metal, leaving a simple sodium sulfate as a by-product.

After removing the solution from the scrap metal the tin may be separated out in metallic form at once; but I prefer to first concentrate the solution to near the crystallizing point by further heating and then allow it to cool before further treatment. The liquid portion may then be drawn off from the crystals and used as a part of the solution with the next lot of scrap, until the resulting solution of tin sulfate is of the desired strength, or the tin may be at once separated out in metallic form by any of the well-known processes, preferably by electrolysis. A current of low tension, either from a battery or dynamo, readily deposits metallic tin upon the cathode in the form of sponge.

The by-product of the process, the simple sulfate of sodium, is in constant demand, and therefore always marketable at a fair price. Indeed this by-product is worth more commercially than the bisulfate first used. The crystals of the simple sulfate which, as is well known, is Glauber's salt, from the original fourteen hundred pounds of bisulfate amount to about eighteen hundred pounds, the increased weight being due to the added water of crystallization.

Thus far I have referred only to the use of bisulfate in an aqueous solution. However, it may be used in many, if not most, cases, preferably in a state of fusion. The chief advantage of the latter condition is that the time of treatment is shortened from several hours to a few minutes. The chemical reactions are of course the same in both cases.

It is evident, of course, that the equivalent potassium salt would accomplish the same results in the process, but would not be so cheap.

The method specifically described above is a convenient way of carrying out my process; but obviously it may be practiced otherwise without departing from the spirit of my invention.

What I claim is—

1. The method of detinning tin-plate herein set forth, which consists in heating the tin-plate in a bath of sodium bisulfate to form a compound of tin, and separating out the tin in metallic form, as set forth.

2. The method of detinning tin-plate herein set forth, which consists in heating the tin-plate in a bath of sodium bisulfate to form a compound of tin, separating the bath and the metallic material from which the tin has been dissolved, and then separating out the tin in metallic form, as set forth.

3. The method of detinning tin-plate herein set forth, which consists in heating the tin-plate in a bath of sodium bisulfate to form a compound of tin, separating and cooling the bath containing said compound, and then separating out the tin in metallic form, as set forth.

4. The method of detinning tin-plate herein set forth, which consists in heating the tin-plate in a bath of sodium bisulfate to form a compound of tin, separating the bath containing said compound, and separating out therefrom the metallic tin by electrolysis, as set forth.

ASAHEL K. EATON.

Witnesses:
WM. H. CAPEL,
DRURY W. COOPER.